United States Patent

Tremblay

[11] Patent Number: 6,038,947
[45] Date of Patent: Mar. 21, 2000

[54] QUICK RETURN FEED FOR MACHINE TOOL

[75] Inventor: Clement Tremblay, Citrus Heights, Calif.

[73] Assignee: Tri Tool Inc., Rancho Cordova, Calif.

[21] Appl. No.: 09/118,940

[22] Filed: Jul. 20, 1998

[51] Int. Cl.⁷ ...................................................... B23B 5/08
[52] U.S. Cl. .............................. 82/113; 82/119; 82/130; 82/136; 82/153
[58] Field of Search ............................. 82/113, 119, 130, 82/131, 132, 135, 136, 141, 153, 61, 70.2, 76, 77, 99.1

[56] References Cited

U.S. PATENT DOCUMENTS

| | | | |
|---|---|---|---|
| 4,762,038 | 8/1988 | Olson | 82/113 |
| 4,944,205 | 7/1990 | Ricci | 82/113 |
| 5,383,380 | 1/1995 | Sartori | 82/132 X |
| 5,549,024 | 8/1996 | Ricci | 82/113 |
| 5,826,470 | 10/1998 | Tremblay | 82/113 |

Primary Examiner—Henry W. H. Tsai
Attorney, Agent, or Firm—Bacon & Thomas, PLLC

[57] ABSTRACT

A tool feed module for a portable lathe machine tool includes a tool block carrying a cutting tool driven by a feed screw incrementally advanced during a cutting procedure by an actuator arm contacting a striker device located on the tool housing. The actuator arm drives the feed screw through an actuator shaft and a one-way drive device permits the actuator arm to pivot in opposite directions while driving the feed screw in increments during pivotal motion in a single direction. To enable reverse rotation of the feed screw and withdrawal of the cutting tool to a starting position rapidly, the actuator shaft is connected to the one-way drive device through a releasable connection that permits rotation of the drive screw by the actuator shaft independently of the one-way drive device.

17 Claims, 4 Drawing Sheets

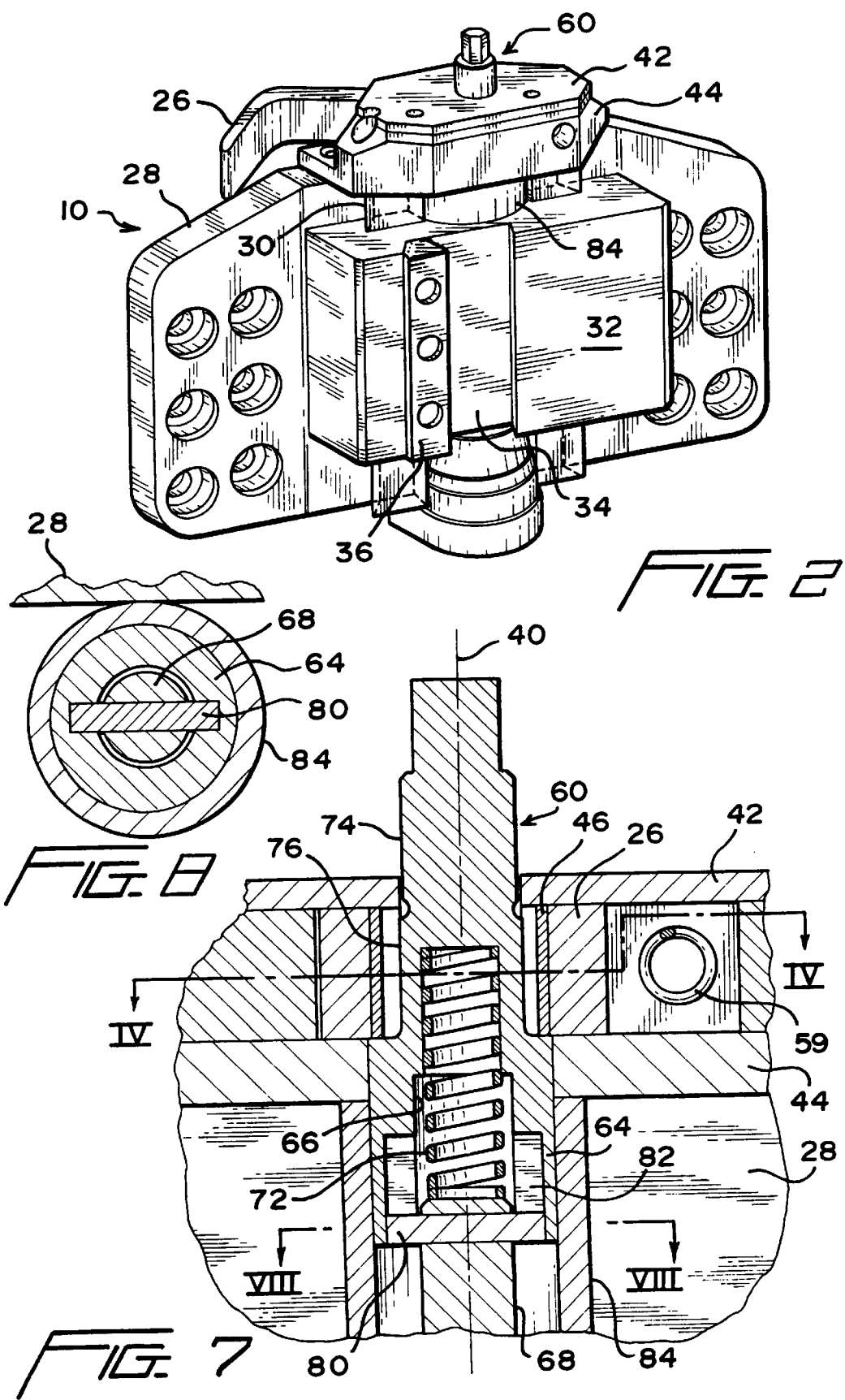

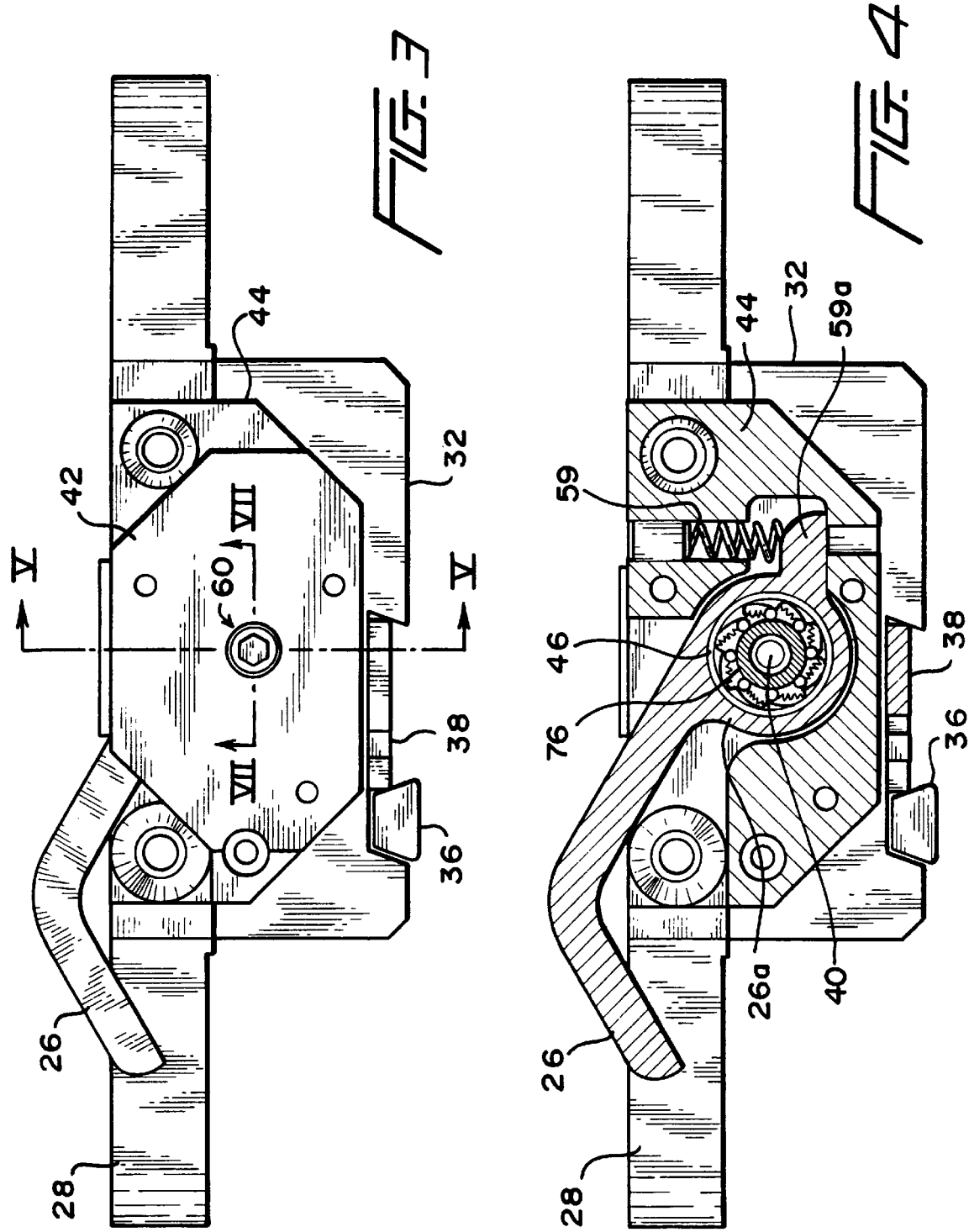

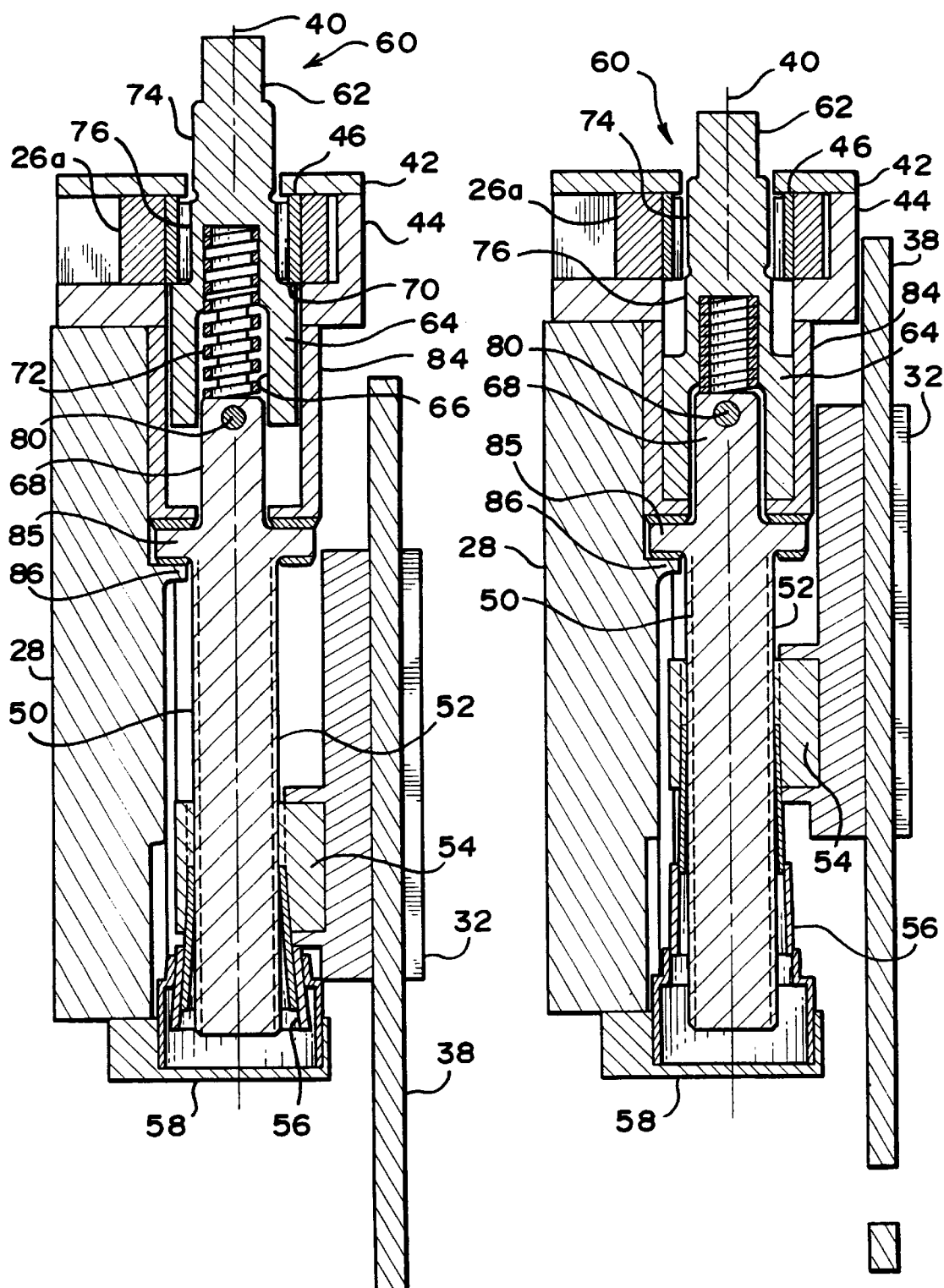

6,038,947

QUICK RETURN FEED FOR MACHINE TOOL

BACKGROUND OF THE INVENTION

1. Field of the Invention

This invention relates to tool feed devices for machine tools such as portable lathes.

2. Related Technology

Feed controls for incrementally advancing cutter tool bits into cylindrical metal work pieces while the tool bit traverses a section of the work piece, typically internal or external peripheral surfaces of the work piece, have various forms in the prior art. Such feed controls are utilized in connection with headstocks of lathes, milling machines and other machine tools to advance the cutting tool into the metal in small increments during machining procedures to remove metal from the work piece.

Typically, a feed screw is utilized to incrementally feed the tool bit into the work piece with the screw being caused to rotate by an actuator system that relies on rotation of the tool bit carrier about an axis of rotation during the cutting procedure. For example, in a portable lathe the tool bit holder is mounted on the headstock of the lathe which rotates relative to the lathe housing and carries the tool holder with the headstock while a feed screw is incrementally rotated periodically by means of an actuator system that utilizes a striker element on the fixed lathe housing that engages the feed screw actuator each rotation of the headstock.

Various adjustments are provided to control the degree of rotation of the feed screw to thereby control the amount of advancement of the tool bit into the work piece each rotation of the headstock. The cutter bit is advanced until the end of the cutting procedure and then the cutter bit must be returned to a starting location relative to the axis of rotation of the headstock.

Exemplary prior art patents illustrating portable lathes using cutting tool holders mounted on a rotatable headstock are U.S. Pat. No. 4,829,860 granted May 16, 1989 and U.S. Pat. No. 5,083,484, granted Jan. 28, 1992. In U.S. Pat. No. 4,829,860, a work piece is held concentrically within the headstock which rotates around the work piece and carries a tool bit holder on which a tool bit or cutter is mounted. The tool bit is advanced radially towards the axis of rotation during a cutting procedure while the headstock rotates about an axis of rotation.

U.S. Pat. No. 5,083,484 shows a different type of portable lathe that is supported by the work piece using a mandrel element extending through the central portion of the lathe tool. The headstock rotates concentrically with the mandrel and may carry a tool bit holder on its front face for machining the end of a pipe engaged by the mandrel.

It is typical to use self-contained tool feed modules mounted to the headstocks of such portable lathes as are described in the aforesaid patents, the tool feed module containing all of the elements required to support a tool bit and control its advancement into a work piece incrementally during machining procedures. Where a feed screw is utilized and is driven through a one-way clutch or other one-way drive device, returning a tool bit from an advanced position at the end of a cutting procedure back to a starting position is problematic because the feed screw is not readily rotatable in the reverse direction because of the presence of the one-way drive device and also because the feed screw is not necessarily accessible by a wrench or machine tool to reverse its rotation rapidly.

BRIEF SUMMARY OF THE INVENTION

The present invention is a quick return device for a modular tool feed system that enables rapid return of the tool carrier to a starting position from an advanced position where it is located at the end of a cutting procedure.

In accordance with a specific exemplary embodiment, the invention includes a tool block support carrying a rotatable feed screw that engages a threaded feed nut connected to a tool block on which a cutting tool may be mounted. The feed screw is incrementally advanced to advance the tool bit into a work piece by an actuator arm that periodically engages a striker located on a fixed part of the machine housing, the actuator arm reciprocating about a pivot axis to drive an actuator shaft connected to the actuator arm. The actuator shaft drives the feed screw through a one-way drive device so that the feed screw is incrementally driven in a single direction a desired amount on each pivotal movement of the actuator arm while reverse rotation of the feed screw is prevented by the one-way drive device.

The actuator shaft engages the one-way drive device but is moveable out of engagement with the one-way drive device when it is desired to reverse the direction of rotation of the feed screw while disengaging the one-way drive device. This is achieved by providing an actuator shaft having a driving surface that engages a one-way drive element when the actuator shaft is in a first position and a second surface smaller than the first surface that disengages the drive elements of the one-way drive device when it is desired to reverse rotate the feed screw or to move the feed screw under manual control. Simple longitudinal movement of the actuator shaft relative to the feed screw achieves uncoupling of the actuator shaft with the one-way drive device in a simple manner while retaining the actuator shaft and feed screw in driving relationship with each other.

BRIEF DESCRIPTION OF THE DRAWINGS

FIG. 2 is a perspective view showing the tool feed module of FIG. 1;

FIG. 3 is a top plan view of the tool feed module of FIG. 1;

FIG. 4 is a partial sectional view taken along line IV—IV of FIG. 7;

FIG. 5 is a partial sectional view taken along line V—V of FIG. 3;

FIG. 6 is a sectional view similar to FIG. 5 showing the actuator shaft of the invention translated axially relative to its position shown in FIG. 5;

FIG. 7 is a sectional view taken along line VII—VII of FIG. 3; and

FIG. 8 is a partial sectional view taken along line VIII—VIII in FIG. 7.

DETAILED DESCRIPTION OF PREFERRED EMBODIMENTS OF THE INVENTION

Figure 1:
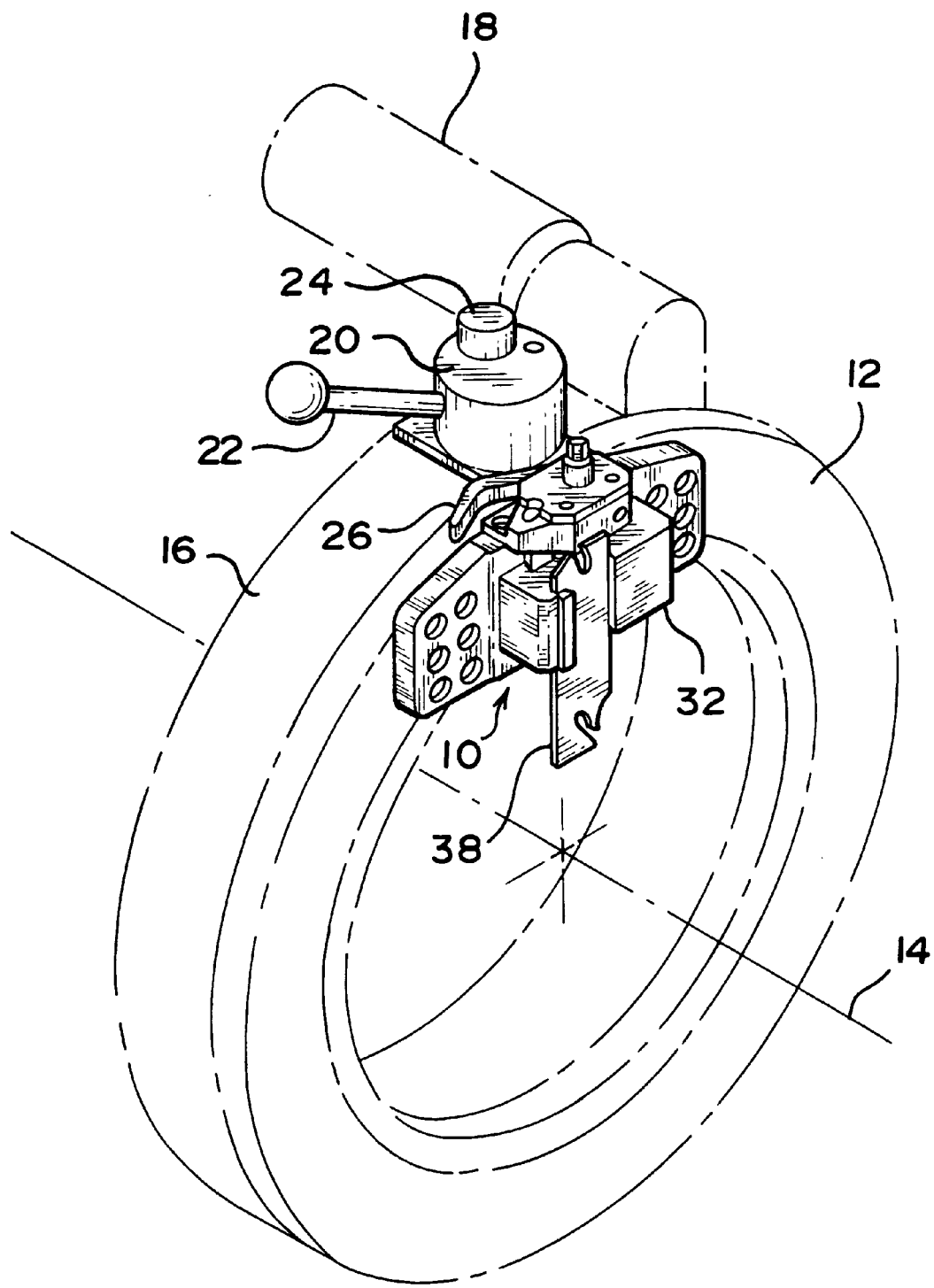
FIG. 1 is a perspective view showing a preferred embodiment of the quick return device for a tool feed module in accordance with this invention and illustrates its relationship with a lathe headstock.

With reference to the appended drawings, a tool feed module 10 is shown in an operational position relative to a rotary headstock 12 of a portable lathe tool of the type, for example, illustrated in U.S. Pat. No. 4,829,860 granted May 16, 1989 and U.S. Pat. No. 5,083,484 granted Jan. 28, 1992, both of which are assigned to the assignee of the present invention. The portable lathe tool is not illustrated and it will be understood that the headstock 12 could be mounted on any type of lathe device used to perform machining operations on work pieces supported concentrically relative to an axis of rotation 14 of the headstock 12. The headstock 12 typically is mounted for rotation about axis 14 on a fixed housing element 16 constituting a portion of the lathe structure. The headstock 12 may be rotated by means of a motor 18 and associated drive gearing (not illustrated).

A striker device 20 typically is mounted on the fixed housing portion 16 and is moveable, for example by rotation of lever 22, about a pivot shaft 24 so as to be selectively located in the path of an actuator lever or arm 26 used to drive a feed screw of the tool feed module 10 or out of said path so as to remain clear of the path of the actuator lever 26. For example, it will be noted that the striker 20 is mounted eccentrically on pivot shaft 24 so that manipulation of lever 22 selectively brings an eccentric portion of the striker 20 into or out of engagement with an actuator lever 26 extending from the tool feed module 10.

As will be described in more detail below, actuator lever 26 is maintained in a starting or rest position by a resilient biasing device whereby engagement between the lever 26 and the striker 20 causes the lever 26 to pivot about an axis of rotation up to a selected degree of angular displacement and then to return to its starting or rest position until it again engages the striker 20 as a result of rotation of module 10 about axis 14 when the headstock 12 is driven in rotation during a machining operation.

While only one module 10 has been illustrated as being mounted on the headstock 12, it will be understood that more than one tool feed module 10 may be provided on the headstock 12, if desired.

The module 10 typically is bolted directly to the face of headstock 12 by any suitable fastener means, typically threaded bolts. The module is thus mountable or removable in selective fashion on headstock 12. As shown in more detail in FIG. 2, tool feed module 10 includes a tool block support 28 that includes appropriate gib elements 30 on which a tool carrying block 32 is mounted for sliding motion towards and away from axis of rotation 14 of headstock 12. Tool block 32 may be formed in any desired fashion consistent with the skills of a tool maker. In accordance with the preferred form of this invention, and for exemplary purposes, tool block 32 includes a tool holder portion 34 that includes an appropriate tool securing element 36 which retains an appropriate tool, such as a cut off tool, in the tool holder area 34. For example, as shown in FIG. 3, a cut off tool 38 is shown retained in the tool holder area by tool securing element 36, the tool 38 extending radially relative to the axis of rotation 14, as shown in FIG. 1.

During a cutting operation utilizing tool 38, the tool 38 is advanced in the direction of the rotation axis 14 of the headstock 12 to perform a cutting procedure and the tool 38 is withdrawn radially away from the axis 14 following completion of the cutting procedure.

Advancement of the tool 38 is effected by periodic rotation of the lever arm 26 driving the tool block 32 towards rotation axis 14 when head stock 12 is rotated and striker 20 is located in the path of the lever 26 during its rotational travel about axis 14. Actuator lever 26 is drivingly connected to the tool block 32 by a driving arrangement to be described below.

Typically, upon completion of a cutting procedure by the tool 38, the tool 38 must be withdrawn from its position at which the cutting procedure has been completed back to a starting position to initiate a subsequent cutting procedure. Depending upon the feed drive arrangement between actuator arm 26 and the tool block 32, this may involve a relatively simple return or withdrawal procedure or may involve a somewhat time consuming reverse rotation of a feed screw used to advance the tool block 32 towards axis 14 during the cutting procedure. The withdrawal of tool 38 away from axis 14 is complicated if a one-way drive device is utilized between the actuator lever 26 and the feed screw typically used to advance the tool block 32 in a tool feed direction. The one-way drive device, for example, transmits rotary motion of actuating arm 26 in one direction while releasing the actuator arm from its driving relationship with a feed screw associated with the tool block 32 when it rotates in the reverse direction. Reverse rotation of the feed screw used to advance the tool block 32 becomes problematic because the one-way drive device typically prevents normal reverse rotation of the feed screw element.

As shown in FIGS. 3 and 4, the actuator lever 26 is mounted on the tool block support 28 for rotation about a lever arm axis of rotation 40 between a cover plate 42 and subhousing 44.

Actuator arm 26 includes a free end located away from axis 40 and an inner end 26a located concentric with axis of rotation 40. The inner end 26a of actuator arm 26 includes an annular opening within which is mounted a one-way drive device 46 which preferably is constituted of cam and roller or ball elements disposed in a circular array and movable towards and away from a central drive area within the drive device when the housing of the one-way drive device is driven in a first direction (for example, counter-clockwise as shown in FIG. 5) but which are withdrawn from the drive area upon rotation of the housing of the one-way drive device in the reverse direction, which permits the roller elements to free wheel within the housing of the one-way drive device. As will be apparent from the discussion to follow below, the various roller elements of the one-way drive device also may be advanced towards the central drive area in the housing of the one-way drive device by rotation of a cylindrical shaft engaging the rollers in the drive area when the shaft is rotated in one direction and the roller elements may be withdrawn from driving relationship when the shaft is rotated in the reverse direction. The position of the rollers in the drive area when a driving relationship with a shaft in the drive area is established defines an operational driving diameter.

This construction is typical of one-way drive devices and the one-way drive device 46 used in the present invention is made by the Torrington Company under catalog number RC-081208.

In accordance with the present invention, the inner end 26a of actuator arm 26 is fixedly secured to the housing of the one-way drive device 46 so that the housing rotates with the actuator arm 26 when the arm is displaced by contact with the striker 20. Rotation of the housing of the one-way drive device 46 in one direction causes the roller elements to advance inwardly to establish an operational driving diameter in the drive area of the housing while reverse rotation of the actuator arm 26 causes the housing of the one-way drive device 46 to be rotated in the reverse direction to release the rollers of the one-way drive device from the drive area of the housing.

A feed screw 50 is mounted on the tool block support 28 for rotation about axis 40 and includes helical threads 52 along a portion thereof that are in preferably threaded engagement with a feed nut 54 fixedly secured to tool block 32. Rotation of feed screw 50 causes advancement of feed nut 54 along the length of the feed screw 50, with the direction of motion of the nut 54 depending upon the angular direction of rotation of feed screw 50. Since the nut 54 is fixedly secured to the tool block 32, rotation of feed screw 50 will cause advancement and withdrawal of the tool block 32 in one direction or the other towards and away from the axis of rotation 14 of headstock 12.

A suitable thread protective cover 56 is provided to cover the exposed threads 52 located below the nut 54. The cover 56 includes relatively telescoping elements that enable the cover 56 to elongate as nut 54 moves along feed screw 50 in an upward direction as shown in FIG. 6 and to become shorter when the feed screw moves in a downward direction in the FIG. 6 view. The bottom of the protective cover 56 may be supported by a cap 58.

As shown in FIG. 4, actuator arm 26 is resiliently biased by a spring 59 acting on a tab 59a of inner end 26a of actuating arm 26. The spring device 59 maintains the actuator arm 26 at an end or rest position as shown in FIG. 4 until it engages the striker 20 or is otherwise rotated in a counterclockwise sense in the FIG. 4 view. Angular displacement of the actuator arm 26 is controlled in both directions by suitable mechanical elements that limit the angular excursion of the actuator arm 26 about axis 40. By controlling the angular excursion of the actuator arm 26, the actual amount of rotation of feed screw 50 each time the actuator arm 26 engages the striker 20 may be established in a precise manner.

Input drive motion to feed screw 50 is provided by means of an actuator shaft 60 carried by tool block support 28 and which is coextensive with and rotatable about axis of rotation 40 of feed screw 50.

Actuator shaft 60 includes a proximal end 62 and a distal end 64 having a bore 66 that may telescopically receive an end 68 of feed screw 50 in telescoping relationship. The transition zone between the proximal end 62 and the distal end 64 of the shaft 60 includes a shoulder 70 that limits movement of the actuator shaft 60 in a direction towards its proximal end 62, the shoulder 70 engaging the underside or bottom of the one-way drive device 46 or any other suitable blocking surface that retains actuator shaft 60 at its location as illustrated in FIG. 5 when it is in driving engagement with the one-way drive device 46 in the manner to be described below.

A spring device 72 maintains the actuator shaft 60 located in a direction away from the end 68 of the feed screw 50 that the relationships between the actuator shaft 60, the feed screw 50, the one-way drive device 46 and the tool block support 28 are maintained in the manner shown in FIG. 5 when the elements are in a first position where rotary input motion to the housing of the one-way drive device 46 is transmitted to the feed screw 50 through actuator shaft 60. This motion transmittal is carried out in a manner now to be described.

Actuator shaft 60 includes adjacent circular driving surface areas 74, 76 having different diametric dimensions, with surface area 74 being smaller in diameter than surface area 76. Surface area 76 is dimensioned so as to cooperate with the one-way drive device 46 when the surface area 76 is located in the drive area of the one-way drive device 46, that is in the position as shown in FIG. 5. Surface area 74, on the other hand, is dimensioned to have a smaller diameter than surface area 76 such that it may never be engaged by the roller elements of the one-way drive device 46 when the surface area 74 is located in the drive area of the one-way drive device 46. This relationship between the surface area 74 of the actuator shaft 60 and the one-way drive device 46 is illustrated in FIG. 6, where the actuator shaft 60 has been axially moved along rotation axis 40 towards feed screw 50 thereby moving surface area 76 out of the drive area of the one-way drive device 46 and locating the surface area 74 within the drive area.

In a typical installation, the difference in diameter between the surface areas 74 and 76 may be on the order of 0.005" (0.0125 cm). Obviously, the difference in diameter between the surface areas 74 and 76 must be sufficient to permit surface area 74 to be entirely free from engagement with the roller elements of one-way drive device 46 regardless of rotary motion of the housing of the one-way drive device 46.

As shown in FIGS. 5, 6 and 8, actuator shaft 60 may be axially translated relative to the feed screw 50 along rotational axis 40 without losing a driving relationship with the feed screw 50 by means of a coupling device comprising a coupling pin 80 transversely extending through a bore in the end 68 of feed screw 50 and engaging opposed slots 82 in the distal end 64 of actuator shaft 60. Alternatively, it will be understood that the slots 82 could be milled completely through the sidewall of the distal end 64 of actuator shaft 60 so as to form a slot or keyway for receiving coupling pin 80. Thus, actuator shaft 60 may be axially moved along the rotational axis 40 towards feed screw 50 to cause disengagement between the driving surface area 76 of actuator shaft 60 and the roller elements of the one-way drive device 46 to release the driving relationship between the lever arm 26, and the one-way drive device 46, on the one hand, from the actuator shaft 60 and feed screw 50, on the other hand. Other forms of coupling devices permitting relative motion can be used as well, for example splines.

A thrust bushing 84 surrounding the distal portion 64 of the actuator shaft 60 is provided to react thrust loads, and to minimize contamination between the distal end 66 of actuator shaft 60 and the area surrounding such distal end 64. The bushing 84 also prevents contamination of the one-way drive device 46 with metal chips and dust that would otherwise enter the one-way drive device from the direction of the tool element 38. Bushing 84 includes an internal bore that provides a guide for axial movement of the distal end 64 of actuator shaft 60, as shown in FIGS. 5, 6 and 7, and a slot in its distal end that enables its assembly over the feed screw and pin 80 that preferably is press-fit in the end 68 of feed screw 50. Bushing 84 provides an axial thrust surface between subhousing 44 and flange 86 of tool block support 28 for feed screw 50, which includes a feed screw thrust flange 85 for retaining the screw 50 axially located. The proximal end 62 of the actuator shaft 60 may include flats permitting engagement of the proximal end with a driving tool for rotating actuator shaft 60.

In operation, after an appropriate cutting tool has been mounted on the tool block 32, for example tool bit element 38, head stock 12 is rotated and striker 20 is placed in a position so that it will engage actuator arm 26 once each revolution of the head stock 12. This will cause periodic pivotal motion of actuator arm 26 about axis 40 which will be transmitted to the housing of the one-way device 46. Rotary motion of actuator arm 26 in a single direction is transmitted through the one-way drive device 46 to actuator shaft 60 and the motion in turn is transmitted to the feed screw 50 through the coupling pin 80. When the tool 38 has reached the end of its cutting procedure, actuator shaft 60 is depressed so as to remove surface 76 from driving engagement with the one-way drive device 46 as shown in FIG. 7.

A tool or other device may then be applied to the proximal end 62 of the drive shaft 60 and rotated rapidly to cause quick withdrawal of the tool 38 back to a starting position as shown in FIG. 7. Release of the actuator shaft 60 reestablishes a driving relationship between the one-way drive device 46 and the surface 76 of the actuator shaft 60 as shown in FIG. 5 so that the next cutting procedure may be initiated in the manner already described.

It will be apparent that, without the release of the driving engagement between the actuator shaft 60 and the one-way drive device 46, reverse rotation of feed screw 50 would be problematic because the one-way drive device 46 normally would prevent reverse rotation of the feed screw 50 and the actuator shaft 60. In effect, the inventive arrangement between the one-way drive device 46, the actuator shaft 60 and the feed screw 50 constitutes a clutch enabling release of the driving relationship between the one-way drive device 46 and the actuator shaft 60.

It is to be understood that the above description and the accompanying drawings are intended to provide an illustrative example of the invention and it is not intended to limit the scope of the invention in any way by the illustrative example. For example, the reversal of the various elements shown in the drawings could be effected without changing the invention because such reversal would be apparent and easily accommodated by persons skilled in the art. While the drive coupling 80 is shown as a pin engaging a slot in the distal end 64 of actuator shaft 60, it will be understood that any type of coupling could be utilized that will accommodate the relative motion between the actuator shaft 60 and the feed screw 50. While a roller type one-way drive device 62 has been illustrated in preferred embodiment, it should be understood that ball elements instead of roller elements could be utilized just as well and virtually any type of one-way drive or one-way clutch device could be utilized as the one-way device 46 described above.

Although the tool feed module 10 has been illustrated with the elements arranged to actuate an axially extending feed screw, it should be understood that the feed screw could be oriented parallel to the direction of axis 14, if desired, and the actuator arm 26 likewise, along with the other driving elements, could be oriented in a manner so as to cooperate with the feed screw 50. Moreover, the tool block need not be directly connected by a nut to the feed screw; a cam drive between the screw and tool block could be used.

While spring elements 59 and 72 have been illustrated for use as resilient biasing elements, it should be understood that any resilient biasing element equivalent to such springs could be utilized in a manner evident to those skilled in the art.

In summary, the scope of the invention is intended to be limited solely by the appended claims taken in conjunction with the appended drawings and the foregoing description of an exemplary embodiment is provided to depict a preferred example of the invention.

I claim:

1. A quick return device for a tool feed mechanism comprising:
    a tool holder;
    a rotary feed screw threadedly connected to the tool holder, the rotary feed screw configured to drive the tool holder in feed and return directions when the feed screw is rotated;
    a pivotally mounted actuator input device and a one-way drive device connected to the actuator input device, the one-way drive device configured to transmit rotary input motion from the actuator input device to the feed screw in a single direction only while preventing reverse rotation of the feed screw in the opposite direction;
    a releasable coupling between the one-way drive device and the feed screw enabling the one-way drive device to be uncoupled from the feed screw and the feed screw to be independently rotated relative to the one-way drive device when uncoupled therefrom.

2. The quick return device according to claim 1, wherein the releasable coupling comprises an actuator shaft connected to the feed screw for transmitting rotary motion between the one-way drive device and the feed screw, said actuator shaft connected to the feed screw through a drive connection enabling transmittal of rotary motion between the actuator shaft and the feed screw while enabling other relative movement between the actuator shaft and the feed screw.

3. The quick return device according to claim 2, wherein the actuator shaft and feed screw are rotatable about coextensive rotational axes.

4. The quick return device according to claim 2, including a resilient biasing device releasably urging the actuator shaft into a coupled relationship with said one-way drive device.

5. The quick return device according to claim 3, wherein said one-way drive device is annular and concentric with said actuator shaft.

6. A quick return device for a tool feed mechanism comprising:
    a tool holder;
    a rotary feed screw threadedly connected to the tool holder, the rotary feed screw configured to drive the tool holder in feed and return directions when the feed screw is rotated;
    a pivotally mounted actuator input device and a one-way drive device connected to the actuator input device, the one-way drive device configured to transmit rotary input motion from the actuator input device to the feed screw in a single direction only while preventing reverse rotation of the feed screw in the opposite direction;
    a releasable coupling between the one-way drive device and the feed screw enabling the one-way drive device to be uncoupled from the feed screw and the feed screw to be independently rotated relative to the one-way drive device when uncoupled therefrom;
    the releasable coupling comprising an actuator shaft connected to the feed screw for transmitting rotary motion between the one-way drive device and the feed screw, said actuator shaft connected to the feed screw through a drive connection enabling transmittal of rotary motion between the actuator shaft and the feed screw while enabling other relative movement between the actuator shaft and the feed screw;
    the actuator shaft and feed screw being rotatable about coextensive rotational axes, said one-way drive device being annular and concentric with said actuator shaft; and
    said actuator shaft being axially translatable relative to the one-way drive device and feed screw, selective axial translation of the actuator shaft effecting coupling and uncoupling of the actuator shaft with the one-way drive device.

7. A quick return device for a tool feed mechanism comprising:
    a tool block support;
    a rotatable feed screw having helical threads and carried by the tool block support for rotation about a feed screw axis of rotation;

a tool block carried by the tool block support, said tool block drivingly connected to the feed screw and movable relative to the tool block support in tool feed and return directions when the feed screw is rotated;

an actuator shaft carried by the tool block support and drivingly connected to the feed screw through a drive coupling device, said drive coupling device arranged to enable positive transmittal of rotary motion between the actuator shaft and the feed screw and to otherwise enable relative movement between the drive coupling device and the feed screw;

said actuator shaft mounted on the tool block support for both rotational motion about an axis of actuator shaft rotation and translational motion along the actuator shaft axis of rotation;

said actuator shaft including a proximal end area comprising a driving surface area extending along the actuator shaft axis of rotation, said driving surface area having a first diametric dimension, and an axially adjacent area having a second diametric dimension less than the first diametric dimension;

a one-way rotary drive device carried by the tool block support and including a one-way drive housing rotatably mounted on the tool block support; one-way drive elements carried by the one-way drive housing and arranged in a circular array around a driving axis of rotation so as to define a drive area extending along the driving axis and having an operational driving diameter;

said housing including motion transmitting elements between the housing and the one-way drive elements arranged so that rotary motion of the housing about the driving axis of rotation in one direction causes the drive elements to assume a driving location in the drive area of the housing and rotary motion in the opposite direction enables the drive elements to assume a nondriving location relative to the drive area;

an actuator lever having an outer motion input end and an inner end connected to the one-way drive housing for rotation therewith;

said driving surface area of said actuator shaft extending through said drive area of said one way drive device concentrically with the driving axis of rotation, the diametric dimension of the driving surface area of said proximal end area corresponding with the operational driving diameter of said drive area such that a one-way driving connection is established between said actuator shaft and said one-way drive device, said one-way drive connection preventing reverse rotation of said actuator shaft;

selective translational motion of the actuator shaft along the actuator shaft axis of rotation causing the driving surface area of the actuator shaft to be located selectively within or outside of said drive area of said one way drive device;

whereby rotational motion of the actuator lever in one direction is transmitted to the actuator shaft and feed screw via the one-way drive elements and reverse rotational motion of the actuator arm is not transmitted to the feed screw, and further whereby axial translation of the actuator shaft selectively engages and disengages a driving connection between the one-way drive elements and the actuator shaft to thereby permit reversible rotation of the feed screw via the actuator shaft independently of any driving connection between the one way drive device and the actuator shaft.

8. The quick return device according to claim 7, wherein said actuator shaft and feed screw are concentrically axially aligned.

9. The quick return device according to claim 7, including a resilient biasing device that normally urges the actuator shaft towards a driving position whereat the driving surface area is located within said drive area.

10. The quick return device according to claim 8, wherein said drive coupling device enables relative motion along the actuator feed screw axis of rotation between the actuator shaft and the feed screw.

11. The quick return device according to claim 10, wherein said driving axis of rotation of said one-way drive device is coextensive with said actuator shaft axis of rotation and said feed screw axis of rotation.

12. The quick return device according to claim 7, including a rotary motion limiting device carried by the tool block support arranged so as to limit the rotary motion of the actuator lever between angular displacement limits; and a resilient lever biasing device for resiliently urging the lever arm towards a starting rest position defining one of said angular displacement limits.

13. The quick return device according to claim 1, wherein the actuator input device, the one-way drive device and the feed screw are rotatable about coextensive rotational axes.

14. The quick return device according to claim 1, wherein the feed screw is covered.

15. The quick return device according to claim 1, further including an eccentric striker device which contacts the actuator as the tool feed mechanism is rotated.

16. The quick return device according to claim 15, wherein the eccentric striker can be adjusted to control the degree of contact with the actuator.

17. The quick return device according to claim 2, wherein the actuator shaft is designed such that another device can be applied to the actuator shaft to cause the quick withdrawal of the tool holder to return to a starting position.

* * * * *